United States Patent
Rasner

(10) Patent No.: US 9,731,914 B2
(45) Date of Patent: Aug. 15, 2017

(54) PNEUMATIC CONVEY SYSTEM WITH CONSTANT VELOCITY PICKUP

(76) Inventor: Michael J. Rasner, Wallace, MI (US)

( * ) Notice: Subject to any disclaimer, the term of this patent is extended or adjusted under 35 U.S.C. 154(b) by 763 days.

(21) Appl. No.: 13/127,954

(22) PCT Filed: Nov. 6, 2008

(86) PCT No.: PCT/US2008/082656
§ 371 (c)(1),
(2), (4) Date: May 5, 2011

(87) PCT Pub. No.: WO2010/053485
PCT Pub. Date: May 14, 2010

(65) Prior Publication Data
US 2011/0211919 A1    Sep. 1, 2011

(51) Int. Cl.
B65G 53/24    (2006.01)
B65G 53/66    (2006.01)

(52) U.S. Cl.
CPC .............. *B65G 53/24* (2013.01); *B65G 53/66* (2013.01)

(58) Field of Classification Search
CPC ........ B65G 53/24; B65G 53/26; B65G 53/60; B65G 53/66
USPC .............. 406/10, 14, 29, 113, 141, 151, 173
See application file for complete search history.

(56) References Cited

U.S. PATENT DOCUMENTS

| | | | | |
|---|---|---|---|---|
| 4,231,686 A * | 11/1980 | Sakamoto et al. | | 406/14 |
| 4,334,370 A * | 6/1982 | Holzenberger | | 37/195 |
| 4,439,200 A * | 3/1984 | Meyer et al. | | 406/99 |
| 4,792,235 A * | 12/1988 | Paul | | 366/107 |
| 5,520,517 A * | 5/1996 | Sipin | | 417/44.3 |
| 5,776,217 A * | 7/1998 | Thiele | | 55/417 |
| 6,361,041 B2 * | 3/2002 | Stephan | | 271/195 |
| 6,447,215 B1 * | 9/2002 | Wellmar | | 406/11 |
| 6,588,988 B2 * | 7/2003 | Zlotos | | 406/14 |
| 6,923,601 B2 * | 8/2005 | Goth | | B65G 53/24 406/152 |
| 7,144,203 B2 * | 12/2006 | Gerber | | B65G 53/66 406/113 |
| 7,740,423 B2 * | 6/2010 | Newbolt et al. | | 406/14 |
| 7,891,930 B2 * | 2/2011 | Brown | | 414/507 |
| 8,360,691 B2 * | 1/2013 | Moretto | | 406/17 |
| 8,491,228 B2 * | 7/2013 | Snowdon | | 406/169 |
| 9,061,842 B2 * | 6/2015 | Vierling | | B65G 53/66 |
| 9,187,267 B2 * | 11/2015 | Abramov | | B65G 53/24 |
| 2014/0348597 A1 * | 11/2014 | Moretto | | B65G 43/08 406/31 |

* cited by examiner

Primary Examiner — Joseph Dillon, Jr.
(74) Attorney, Agent, or Firm — Mitchell Intellectual Property Law, PLLC

(57) ABSTRACT

An pneumatic convey device that employs active vacuum pressure monitoring using either a pressure sensor or vacuum motor power consumption to maintain a constant velocity pickup point, reduce product damage, increase capacity per vacuum pressure when the system is running at less than designed vacuum and reduce energy consumption at the point where the material convey starts.

3 Claims, 3 Drawing Sheets

PNEUMATIC CONVEY SYSTEM WITH CONSTANT VELOCITY PICKUP

FIELD OF THE INVENTION

The present invention relates generally to a method for transporting solid particles pneumatically. More specifically, the present invention relates to a vacuum-based method for controlling the velocity level at the pick-up point.

BACKGROUND OF THE INVENTION

In the plastic extrusion industry, raw plastic material, called "resin" in the industry, is melted and formed into a continuous profile. Extrusion produces items such as piping, tubing, window frames, rolls of film, bags, sheets and the like. In the extrusion of plastics, raw thermoplastic materials in the form of small pellets of resin are used to make the plastic end-product. The pellets start out in a product supply container, such as a silo or gaylord box. A pneumatic system is used to move the plastic pellets from the supply container to one or more vacuum receivers. Pellets are dispensed from the vacuum receivers into a blender where pellets of different types, i.e. the "ingredients" for the recipe, and in pre-determined quantities, are combined to produce the end product in accordance with the pre-determined product recipe. Additives such as colorants and ultraviolet inhibitors, for example, which are also distributed in pellet form, can be dispensed in like fashion.

Once blended, the ingredients enter the feed throat of a plastic extruder, the feed throat being disposed to one end of the extruder. The ingredients then come into contact with a rotating screw which forces the pellets through a barrel within which the screw is rotating. The barrel is heated to a desired temperature which allows the pellets to melt gradually as they are pushed through the barrel. Extra heat is contributed by the intense pressure and friction that takes place within the barrel. At the opposite end of the extruder barrel, the molten plastic enters a die, which gives the final product its profile. The plastic exits in continuous form to be cut in lengths or coiled, depending upon the end product desired.

In the extrusion molding system, as is also true with alternative methods of compression, transfer and injection molding, the raw material, i.e. the resin pellets, must be moved about and distributed to extruders as is required for processing. This is typically accomplished through the use of pneumatic systems having vacuum pumps that move the pellets through and along vacuum lines and the like.

Prior systems were designed to maintain a pick-up velocity in excess of the worst case requirement for said material under maximum design vacuum level. The disadvantage of such systems is that at lower vacuum levels or lower pick-up velocity requirement the material is conveyed at a velocity which is greater than is necessary. The problems caused by conveying at higher than required velocities are as follows: (1) formation of angel hair, streamers, or stringers, ("streamers") (2) reduction in system efficiency and (3) material degradation.

Such systems operate far in excess of the saltation velocity to avoid such blockages. The disadvantage of such systems, aside from energy consumption is that the higher velocity may damage the particulates conveyed.

For most such materials, the "pick up" velocity is at least 4,000 feet/minute (fpm). However, there is a wide range of variance between material properties. The inventors know of various materials used in plastic extrusion that have differing properties and can require pickup velocities between, for example, 3,500 fpm and 6,000 fpm. Applicant has partially addressed conveyance of materials with different properties with its Smart Connect Stand. A feature of the Smart Connect Stand is that it can be programmed to identify the type of material being conveyed. As a result, the properties of the material to be conveyed are known, such as the appropriate pickup velocity.

Material pickup velocity is critically important over long conveys. Over long conveys, such as from an exterior storage bin, there is a increasing velocity gradient, that is, the material steadily gains in velocity. As indicated above, above certain velocities, the particulate material used in plastic extrusion may strike the walls of the conduit and elongate, forming long ribbons or strings known in the industry as "streamers." Streamer formation is extremely undesirable as the resins conveyed in pellet form have certain properties desired for the extrusion. Streamer creation frequently alters the property of the resins thereby reducing the quality of, or ruining the end product extrusion. Additionally, streamer creation can block conduits and cause production downtime.

An additional variable unaccounted for in prior systems is the existence of bleed valves in storage vessels such as railroad cars and other storage devices. These bleed valves are referred to in the industry as manual flow control valves. Opening and closing a bleed valve can cause significant variations in system pressure, and therefore particulate speed and streamer formation. Varying the flow control valve results in an increase or decrease in the material to air ratio. Increasing the material to air ratio is accomplished by closing the manual flow control valve. Increasing the material to air ratio increases the system vacuum level at the pump.

What is needed is a convey system that can maintain a constant pick-up velocity even under varying load conditions (vacuum levels). Such characteristics in pneumatic solids convey improve system efficiency, reduce the propensity for material degradation, and reduce the propensity for the formation of "angel hair".

SUMMARY OF THE INVENTION

The claimed invention provides an improved conveying device for particulate materials by providing a constant velocity at the particulate pickup point. More specifically, the claimed invention provides an improved means for conveyance of particulates from a bulk storage vessel through a conduit to a downstream location, such as receiver or an upstream storage device. In a claimed embodiment, the particulates are conveyed using a vacuum pump located downstream of the pickup point. The vacuum pump operates to draw air and particulate materials through an inlet such as a probe. In operation, the air flowing past the pickup point picks up the material to be conveyed and conveys it to a receiver, such as for intermediate storage prior to extrusion.

In such an embodiment, the desired pickup velocity of the material is known along with the inside diameter of conduit. Given this information, the pump is operated at a certain minimum speed such that the particulate material is picked up and such the particulate material exceeds the terminal velocity, the velocity at which the material drops out of the air flow throughout the convey path. However, while saving energy, increasing efficiency and reducing the likelihood of stringer formation are features of the claimed invention, avoidance of blockages in the convey line is also critical to the claimed invention.

Therefore the claimed invention actively monitors the vacuum level at or near the inlet of the vacuum pump (ICFM). The SCFM (Standard Cubic Feet per Minute) is calculated and used to calculate the air velocity at the pick-up point. This calculation involves the inside diameter of the conduit, the performance curves for said vacuum pump, the atmospheric conditions of said pick-up air, and vacuum level at the inlet of said pump. The system then varies the speed of the motor driving the said vacuum pump in such a way as to maintain the desired pick-up velocity as set by the operator or programmed into the system as a property of said material flowing through said conduit.

A claimed alternative is to use the controller to monitor the power consumption of the motor powering the vacuum pump. One such option for measuring vacuum level at the inlet of the pump is to use the variable frequency drive to determine motor output power to the pump. Through a calculation using the pump's characteristic curve data the vacuum level can be determined. Other such conventional means of monitoring vacuum such as a transducer can also be used. As power consumption increases at a fixed pump speed, a controller is provided, said controller being operable to increase the power to the pump to limit the likelihood of convey line blockage. When power consumption at speed decreases, the controller is operable to decrease vacuum pump speed.

The claimed invention has broad application in many industries wherein pneumatic convey systems are used to move bulk products from one location to another and its application is not limited to the extrusion industry. The power consumption and increased capacity characteristics of the invention have application throughout the pneumatic convey industry.

DETAILED DESCRIPTION

Figure 1:
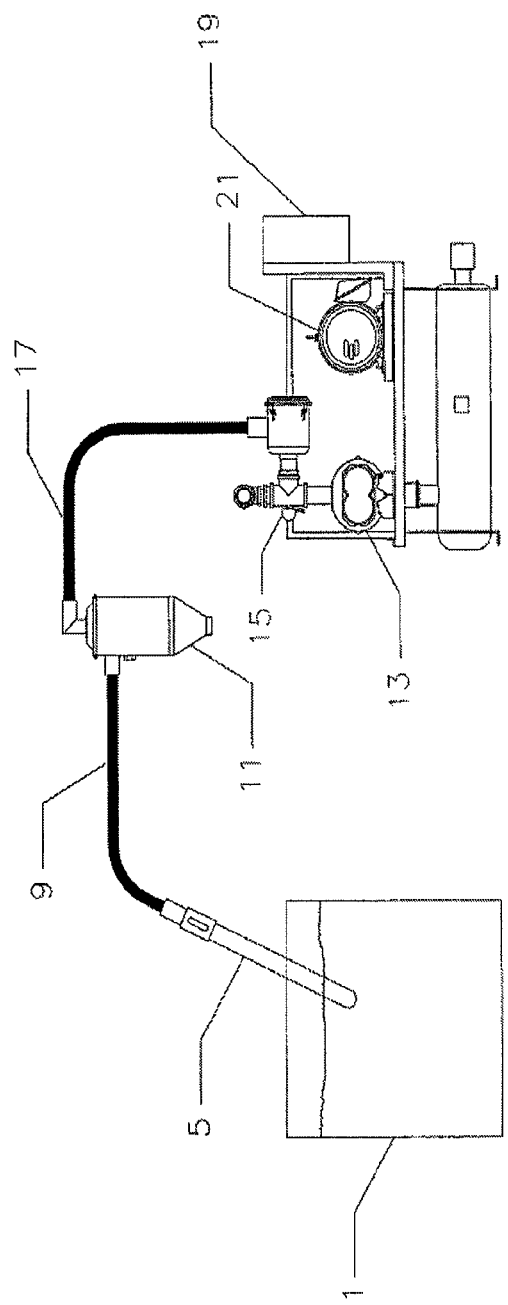
FIG. 1 is a schematic overview of a vacuum convey system configured in accordance with the claimed invention.

Now referring to the drawings in detail wherein like reference numerals refer to like elements throughout, FIG. 1 is schematic view of the pneumatic convey system of the claimed invention. In further detail, FIG. 1 shows a bulk storage vessel 1 having a probe for therein for picking up particulate materials. FIG. 1 further shows the convey line 9 between the storage vessel 1 and the downstream receiver 11. A vacuum line 17 connects the receiver 11 with the vacuum pump 13. The vacuum pump 13 is a positive displacement pump. The vacuum created by the vacuum pump 13 therefore varies linearly with speed of the speed of the vacuum pump 13.

FIG. 1 further shows a separate motor control circuit. Specifically, FIG. 1 shows a controller 19, vacuum sensor 15 and vacuum pump 13, which is driven by a variable frequency drive motor 21. Controller 19 has been preprogrammed with specific material properties, including optimal material pick up velocity or is in communication with an intelligent connection system such as is described in applicant's prior disclosure PCT/US2007/071384, entitled Smart Connection System and Method, which is hereby incorporated by reference. The controller 19 then optimizes the convey system by selecting the preprogrammed material pickup velocity.

As has been indicated above, one claimed embodiment requires a pressure sensor 15 and one does not. In the claimed embodiment that requires a vacuum sensor 15, the pressure sensor 15 is located upstream of the pump 13 in the vacuum line 17.

The claimed invention may employ either power consumption monitoring or pressure monitoring to ensure that vacuum pump 13 speed is increased or decreased appropriately.

Figure 2:
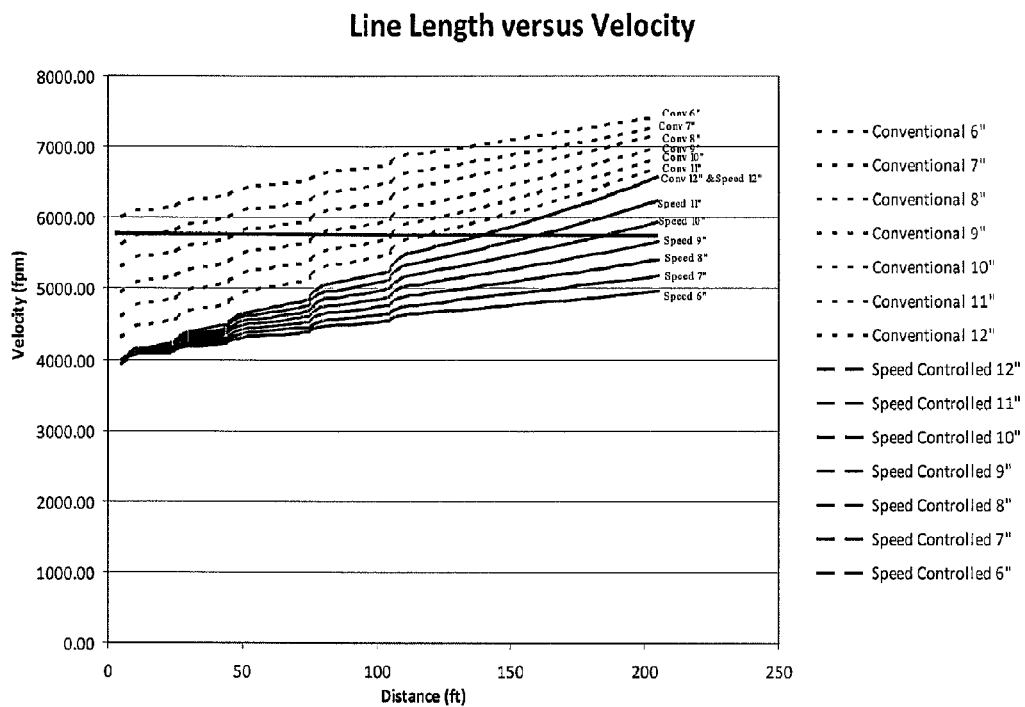
FIG. 2 is a chart depicting the behavior of a material at varying vacuum levels velocity over a specific distance. The different curves represent the velocity gradient in the line and the lower average velocity that is attained with a variable speed controlled motor driving a positive displacement vacuum pump.
Figure 3A:
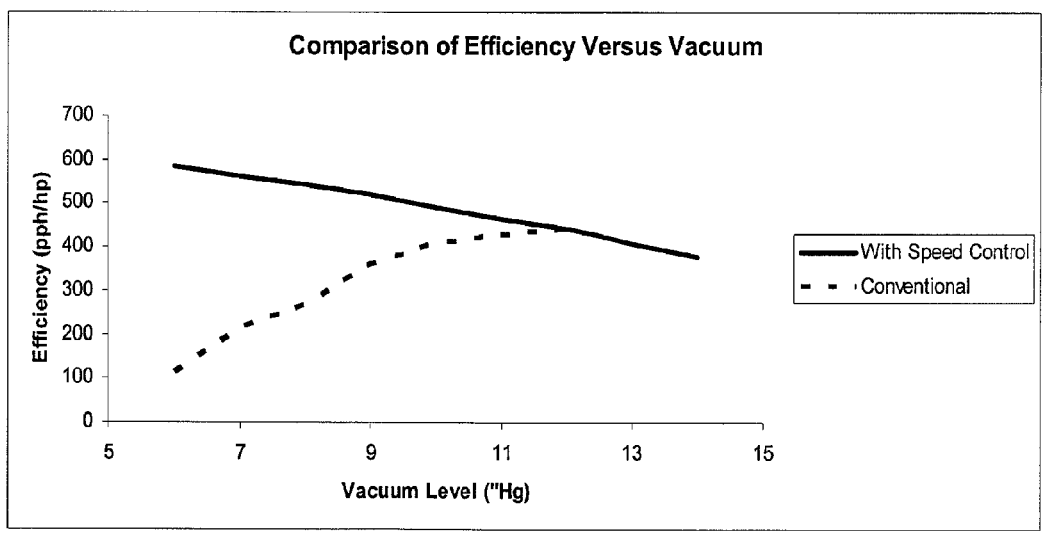
FIG. 3A is a chart depicting a comparison between the efficiency in terms of pounds per hour/horsepower versus vacuum level of a speed controlled convey system and a conventional system.
Figure 3B:
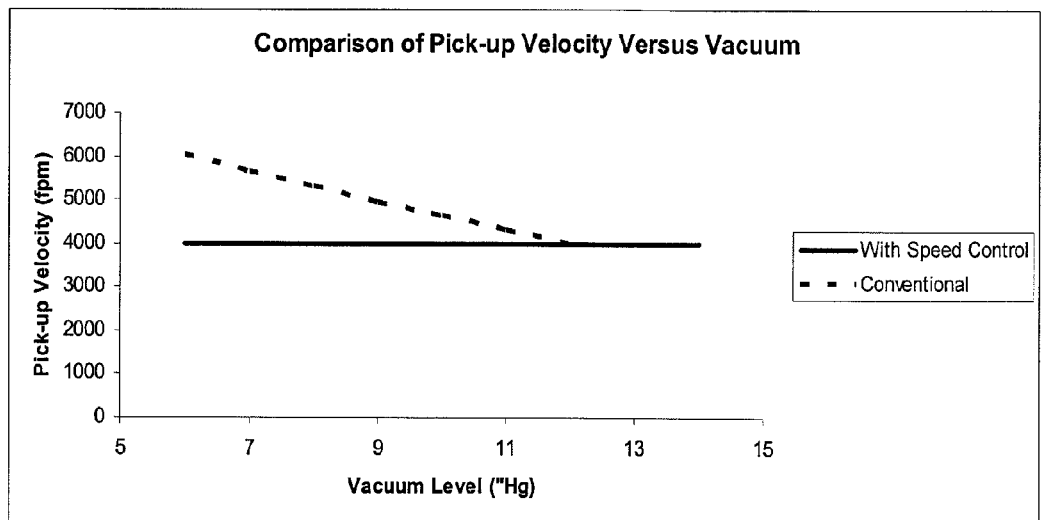
FIG. 3B is a chart depicting a comparison between pickup velocity in a speed controlled convey system and a conventional system versus the vacuum level.
Figure 3C:
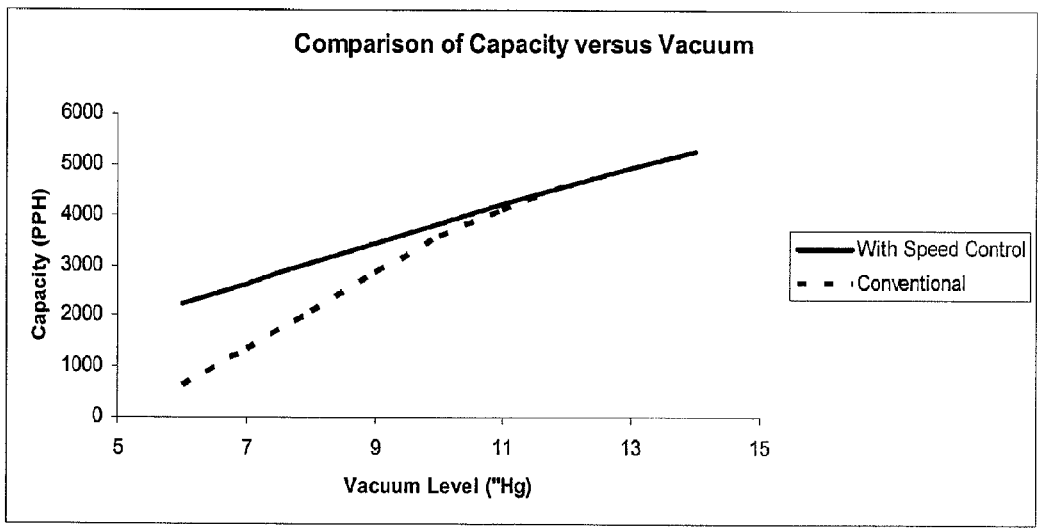
FIG. 3C is a chart depicting a comparison between the capacity of a speed controlled convey system and a conventional system versus the vacuum level.

Applicant's invention provides a number of critical advantages in terms of power consumption, capacity and efficiency, as are detailed in FIG. 2 and FIG. 3. FIG. 2 is a chart that represents the velocity of a given material over the length of a convey. In the case of the particulate material chosen, streamer formation begins at a velocity of approximately 5,750 feet per minute. Actual streamer formation will vary based on materials and conditions. Additionally, the amount of streamers formed will increase as velocity increases. As is apparent from FIG. 2, use of a speed controlled system reduces the likelihood of streamer formation by keeping velocity below the velocity at which streamers are formed.

FIG. 3A shows a plot of efficiency vs. vacuum level in both a conventional system and a speed controlled system. As shown, as vacuum levels are reduced the efficiency gain rises in comparison to conventional systems. FIG. 3B shows a plot of the capacity of both a speed controlled system and a conventional system versus the vacuum level. Again, the speed controlled system has significantly more capacity than the conventional system, particularly at lower speeds. FIG. 3B shows a further benefit of a constant velocity system. Over an entire range of operating pressure, the constant velocity system maintains the desired pickup velocity.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A vacuum conveyance system adapted for conveying particulates from a particulate source to a particulate destination, said system comprising:
    a particulate convey line comprising a pick-up probe at one end for insertion into a particulate source and picking up particulate when a vacuum is drawn on said convey line;
    a downstream receiver for said particulate;
    said convey line extending from said probe to, and being connected to, said downstream receiver for said particulates;

a variable speed vacuum pump having an inlet and a variable speed motor;

a vacuum line connected at one end to said downstream receiver and at its other end to said inlet of said vacuum pump, whereby operation of said vacuum pump draws a vacuum on said downstream receiver and draws particulate material into said downstream receiver;

a vacuum sensor positioned at or near to an upstream from said inlet to said vacuum pump for sensing the vacuum level at or near said inlet of said vacuum pump;

a controller operably connected to said vacuum sensor, said controller selectively operable to either actively monitor the vacuum level at or near said vacuum pump or monitor the power consumption of said variable speed motor;

said controller being operably connected to said vacuum pump, and actively operating in response to said vacuum level as determined by said vacuum sensor and to vary said pump speed to maintain a constant pick up air flow velocity at said probe as said particulate is being picked up and conveyed by said convey line to said downstream receiver.

2. The vacuum conveyance of system of claim 1 wherein the controller is operable to set the pump speed based on the particular performance curves for the selected vacuum pump, the size of the particulate convey line, and the target pick-up velocity for said vacuum convey system.

3. The vacuum convey system of claim 1 wherein the controller is preprogrammed with a plurality of pump velocities and the controller is operable to reduce the speed of the vacuum pump in steps to maintain a constant velocity pickup point.

* * * * *